(12) United States Patent
Wiechers

(10) Patent No.: US 6,865,548 B2
(45) Date of Patent: Mar. 8, 2005

(54) VIRTUAL PUBLISHING SYSTEM AND METHOD

(75) Inventor: Alejandro Wiechers, Jalisco (MX)

(73) Assignee: Hewlett-Packard Development Company, L.P., Houston, TX (US)

( * ) Notice: Subject to any disclaimer, the term of this patent is extended or adjusted under 35 U.S.C. 154(b) by 368 days.

(21) Appl. No.: 09/749,369

(22) Filed: Dec. 18, 2000

(65) Prior Publication Data

US 2002/0077926 A1 Jun. 20, 2002

(51) Int. Cl.$^7$ .............................................. G06F 17/60
(52) U.S. Cl. ............................. 705/50; 705/51; 705/1; 713/200
(58) Field of Search ............................. 705/50, 51, 1; 713/200

(56) References Cited

U.S. PATENT DOCUMENTS

| | | | |
|---|---|---|---|
| 5,915,019 A | 6/1999 | Ginter et al. | |
| 5,982,891 A | 11/1999 | Ginter et al. | |
| 5,986,690 A | 11/1999 | Hendricks | |
| 6,012,890 A | 1/2000 | Garrido | |
| 6,088,702 A | 7/2000 | Plantz et al. | |
| 2002/0035697 A1 * | 3/2002 | McCurdy et al. | 713/200 |
| 2003/0080999 A1 * | 5/2003 | Stone et al. | 345/751 |

FOREIGN PATENT DOCUMENTS

WO    WO 00/48098    *   8/2000    ........... G06F/17/30

OTHER PUBLICATIONS

Anderson et al., "Editing a Web Site: Extending the Levels of Edit", Mar. 1998 IEEE, vol. 41, No. 1, pp. 47–57.*
Nawotka, "From the Web to the page", Nov. 27, 2000, Publishers Weekly.*
"How can we help you?" e–bookonline (uk) itd, http://www.e–booksonline.net/submit_book.html Sep. 29th, 2000.
"Publishing on the Internet through digital book." http://www.applebookshop.co.uk/publishing.htm Dec. 1st, 2000.
"Re [eBook–list] can you beat their offer?" Michael Ward, Jan. 16th, 2000, http://www.planetebook.com/ebook–list/ebook–list–07183.html.

* cited by examiner

Primary Examiner—James P. Trammell
Assistant Examiner—Jalatee Worjloh

(57) ABSTRACT

A virtual publishing system and associated method for publishing an authored work in a communications network environment includes a publisher, a repositor linked with the publisher, and a sales manager linked with the publisher and the repositor. The publisher converts the authored work to a resulting commercial-grade publication. The repositor is provided for storing the commercial-grade publication received from the publisher. The sales manager retrieves the commercial-grade publication from the repositor and distributes that commercial-grade publication.

16 Claims, 2 Drawing Sheets

VIRTUAL PUBLISHING SYSTEM AND METHOD

FIELD OF THE INVENTION

This invention relates to a virtual publishing system and method. In particular, the invention relates to a system and method for enabling an author to directly access all stages of an existing commercial publishing process to create and sell a commercial-grade publication. The system and method generate a commercial-grade publication without submitting an authored work to a traditional publishing house.

BACKGROUND OF THE INVENTION

Typically, if one wishes to publish an authored work for commercial sale they must do so by submitting that work to a publishing house. Within the publishing house the authored work is subjected to a structured procedure in preparation for commercial publication. In this application, the term "commercial-grade publication" is defined as an authored work prepared for commercial publication, such as a book, magazine, newspaper or pamphlet, for example.

At the publishing house, a work is first edited for content. After it is edited for content, the work is typically evaluated for marketing purposes. Evaluating a work's marketability identifies whether the work will be profitable and, thus, commercially successful for the publishing house. To add commercial appeal, marketing personnel at the publishing house establish a "look and feel" of the publication by developing the layout of the authored work, sometimes with critical interaction from the author. Establishing a layout involves developing artwork for a cover as well as typesetting text onto pages. Often marketing personnel conduct standard marketing tests outside the publishing house to determine potential commercial success of an authored work in terms of audience appeal of the layout as well as the content.

Upon completion of the marketing evaluation, a bookproof or "galley" is made. A galley copy is a comprehensive final draft of the authored work before publication. The galley copy is reviewed for additional, often minor, revisions by the author, the publishing house as well as by experts that add marketing appeal to the galley such as notable experts in the galley's related field or even popular celebrities. Then, on successful review of the galley, the resulting commercial-grade publication is advanced for publication. Publication involves reproducing the commercial-grade publication for sale.

A publishing house transports commercial-grade publications from the printers to various outlets, such as retail bookstores or libraries, through established distribution channels for commercial transport, such as by truck or cargo plane, for example. Typically, a larger publishing house has more profitable channels of distribution as compared with smaller publishing houses. In short, after an authored work is submitted, a publishing house ultimately dictates the commercial value of that work with minimal or no further input from the author. In return for its investment, the publishing house receives a profitshare from the commercial-grade work.

Thus, as a matter of saving cost, labor, and time, there is a need for an Internet based system for subjecting an authored work to a structured procedure similar to that of an existing publishing house in preparation and selling of commercial publications.

SHORT STATEMENT OF THE INVENTION

Accordingly, the present invention is directed to a system and method for enabling an author to directly access all stages of the commercial publishing process without submitting an authored work to a traditional publishing house. In one embodiment of the invention, a virtual publishing system and associated method for publishing an authored work in a communications network environment includes a publisher, a repositor linked with the publisher, and a sales manager linked with the publisher and the repositor. The publisher converts the authored work to a resulting commercial-grade publication. The repositor is provided for storing the commercial-grade publication received from the publisher. The sales manager retrieves the commercial-grade publication from the repositor and distributes that commercial-grade publication. The sales manager distributes the commercial-grade publication in a format readable by electronic media such as a computer, electronic hand-held devices or a digital printer, for example. Moreover, the sales manager accounts for each distribution for purposes of collecting revenue for the virtual publishing system.

Computer program code accompanies the virtual publishing system for publishing the authored work. The computer program code includes code for converting the authored work to a resulting commercial-grade publication as well as code for storing the commercial-grade publication. Code is also provided for retrieving the commercial-grade publication from storage and distributing that publication.

In a further embodiment of the present invention, a network addressable device provides a publisher, a repositor, and a sales manager. The publisher interfaces with a remote service provider for preparing the authored work for marketability as well as for publication of the authored work. The repositor provides the commercial-grade publication to the sales manager.

The network addressable device also includes an encoder linked with the publisher, the repositor, and the sales manager. The encoder secures information associated with the authored work from unsolicited disclosure outside the network addressable device. It should be added that the network addressable device may be linked with either the Internet or an intranet communications network.

In a still further embodiment of the present invention, a method of publishing an authored work in a communications network environment is provided so that an authored work is received, converted to a commerial-grade publication and stored in a repository. Moreover, the commercial-grade publication may be distributed by a sales manager from the repository to a consumer.

DETAILED DESCRIPTION OF THE PREFERRED EMBODIMENT

Figure 1:
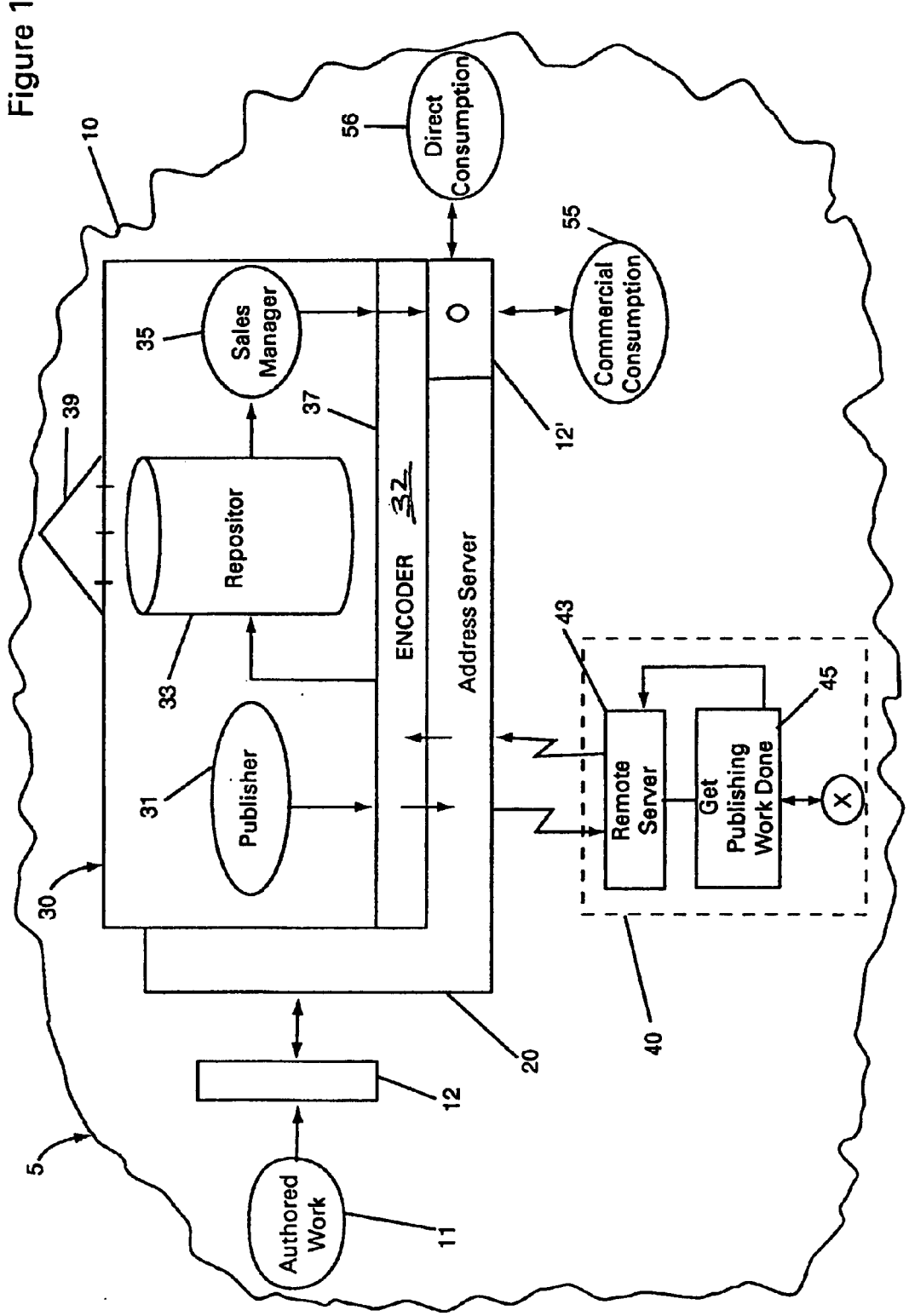
FIG. 1 is a schematic diagram of a preferred embodiment of the virtual publishing system of the present invention.
Figure 2:
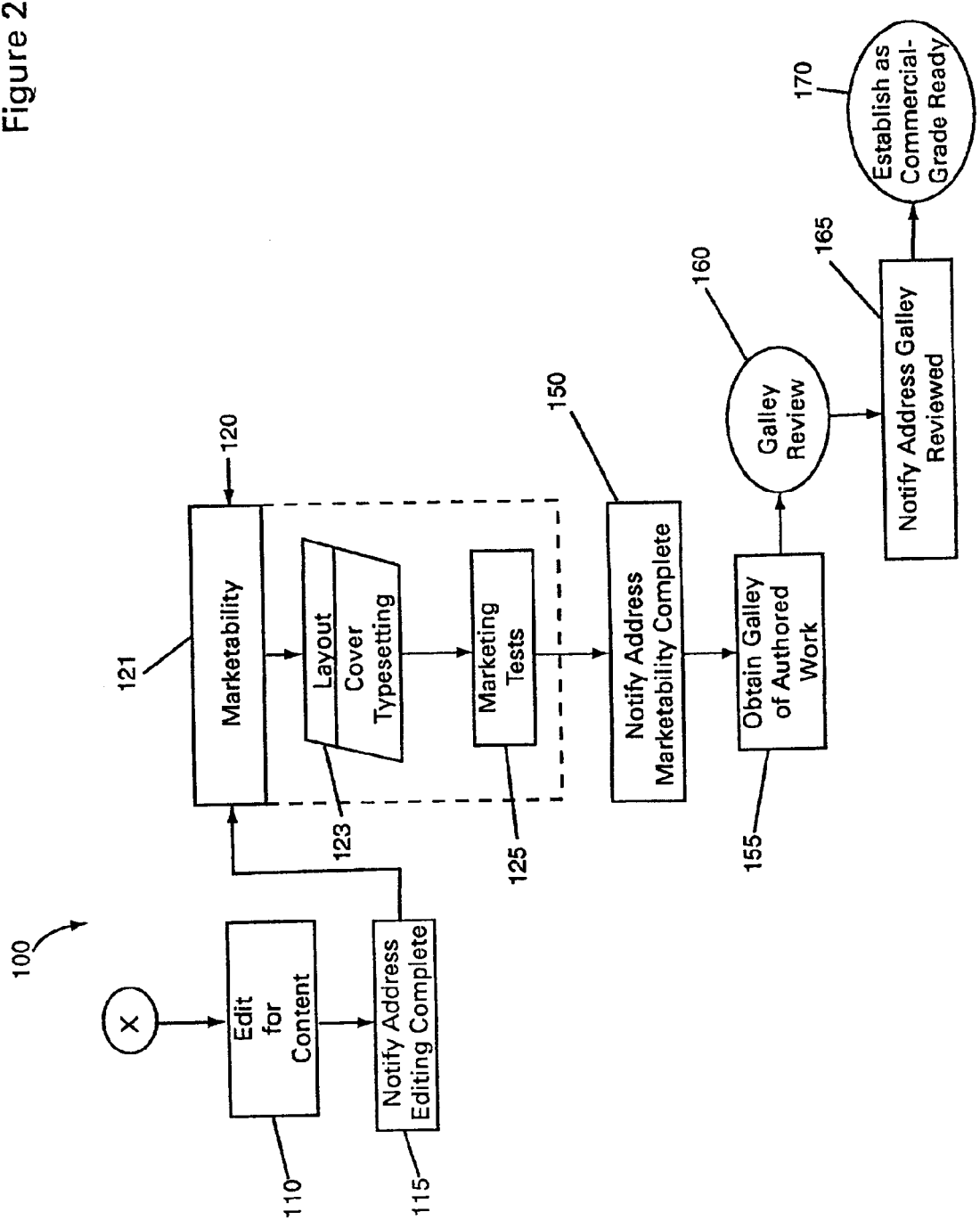
FIG. 2 is a schematic diagram of the publishing process executed by a publisher of FIG. 1.

The preferred embodiment of the present invention is illustrated by way of example in FIGS. 1 and 2. With specific reference to FIG. 1, a virtual publishing system 5 includes a communications network 10 and a network addressable device 30 in engagement with the communications network 10.

The virtual publishing system 5 is constructed of various software components or processes operating on a digital computer or a network of digital computers. In the preferred embodiment, the software components or processes composing the virtual publishing system 5 are configured for engagement with communication networks of a type well known in the industry, such as the Internet for example. Accordingly, the communications network 10 comprises an Internet communications network environment but other embodiments contemplate an intranet communications environment.

The network addressable device 30 is a location within the communications network 10, such as an Internet address or Universal Resource Locator (URL) for example. The network addressable device 30 is linked with an address server 20. The address server 20 provides user-access to the network addressable device 30. Shown in FIG. 1, the address server 20 is preferably connected with a browser 12 for facilitating access to the network addressable device 30 through a graphical format. The browser 12 is of a type well known in the art, such as NETSCAPE NAVIGATOR or MICROSOFT EXPLORER for example. Other embodiments of the virtual publishing system 5, however, do not incorporate a browser.

An authored work 11 is introduced to the network addressable device 30 through the browser 12 and the address server 20. In the preferred embodiment, the authored work 11 includes written material or multi-media material including written, visual, and audible material. The authored work 11 is in a digital format compatible with that of the communications network 10. Therefore, the authored work 11 is presented to the network addressable device 30 via the browser 12 and the server 20. Ultimately, the network addressable device 30 is a tool for publishing an authored work. In this disclosure and accompanying claims the term "publish" or "publishing" is defined as preparing an authored work for commercial sale, including distribution thereof. In other words, publishing refers to the process of preparing and distributing a commercial-grade publication from an authored work. Distribution, in turn, is understood as either direct distribution to a consumer or indirect distribution to a consumer via wholesale or retail outlets.

The network addressable device 30 includes a central logic unit 39. The central logic unit 39 executes a computer program code for publishing an authored work in a communications network 10. As is preferred, FIG. 1 depicts the central logic unit 39 executing the program code exclusively for the network addressable device 30. However, those of ordinary skill in the art will recognize that the central logic unit 39 in other embodiments may execute other operations besides the computer program code for the network addressable device 30, such as managing other network addresses for example.

For publishing the authored work 11, the network addressable device 30 includes a publisher 31, a repositor 33, and a sales manager 35, each linked with the central logic unit 39. Moreover, the network addressable device 30 includes an encoder 32 linked with the address server 20 as well as with the publisher 31, the repositor 33, and the sales manager 35. The encoder 32 secures information associated with the authored work 11 from unsolicited disclosure outside the network addressable device 30.

Through a program sequence, the publisher 31 converts the authored work 11 to a resulting commercial-grade publication as well as indicates on the network addressable device 30 the status of progress for converting the authored work 11 to a resulting commercial-grade publication. Generally, by accessing an array of remote service providers 40, the program sequence enables the publisher 31 to convert the authored work 11 to a commercial-grade publication. In a preferred embodiment, the program sequence comprises a computer program code for converting the authored work 11.

The publisher 31 manages the publishing process for each authored work received by the network addressable device 30. In FIG. 1, the publisher 31 sends each authored work from the address server 20 to a remote service provider 40. In this disclosure and accompanying claims, the term "remote service provider 40" refers to any entity outside the network addressable device 30, retained by the device 30, for converting the authored work to a commercial-grade publication, such as content editors, marketing editors, and typesetters for example. Each remote service provider 40 includes a remote server 43 for providing access between the network addressable device 30 and the remote service provider 40. As such, reference numeral 45 generally indicates each service performed on the authored work 11 by the remote service provider 40, such as editing and printing for example. It should be added that the remote service provider 40 need not be the same entity so that, preferably, different service providers 40 may perform different tasks to ultimately convert the authored work 11 as well as keep overall publishing costs low.

FIG. 2 illustrates the preferred program sequence by which the publisher 31, in cooperation with the remote service provider 40, converts the authored work 11 to a commercial-grade publication. Accordingly, the authored work 11 is sent to the publisher 31 in step 100. On receiving the authored work 11, the publisher 31 in step 110 interfaces with the remote service provider 40. The publisher 31 sends the authored work 11 through the encoder 37 for content editing by the service provider 40. When editing for content is completed, the service provider 40 in step 115 notifies the publisher 31 and forwards the work to the publisher 31. The central logic unit 39 indicates this completion on the network addressable device 30 and directs the publisher 31 to advance to step 120.

In step 120, the publisher 31 directs the authored work 11 across the encoder 37 in preparation for marketability. Marketability preparation step 120 includes steps 121, 123, and 125. In step 121, the remote service provider 40 subjects the authored work 11 to an ad hoc review for overall commercial success or marketability by specialized personnel at the remote service provider 40. Next, in step 123, the remote service provider 40 develops the layout of the authored work 11 to add commercial appeal. For example, developing the layout includes developing artwork for a cover as well as typesetting text onto pages. During layout development in step 123, the central processing unit 39 may direct critical input from the author of the authored work 11 via the publisher 31. The publisher 31 advances from step 123 to 125 so that marketing tests are performed in step 125. The service provider 40 conducts marketing tests to determine potential commercial success of the authored work 11 in terms of audience appeal toward layout as well as content When marketability preparation is completed in step 120, the service provider 40 in step 150 notifies the publisher 31 and forwards the authored work 11 to the publisher 31. The central logic unit 39 indicates this completion on the network addressable device 30 and directs the publisher 31 to advance to step 155. In step 155, the service provider 40 generates a comprehensive final draft of the authored work 11 before publication, commonly referred to in the industry as a "galley" copy. In step 160, the publisher 31 enables the galley copy to be reviewed by the author as well as relevant service providers for additional, often minor, revisions before advancing to step 165. The service provider 40 in step 165 notifies the publisher 31, and the central logic unit 39 indicates completion of galley review to the network addressable device 30 before advancing to step 170. In effect, the completion of the galley review marks the conversion of the authored work 11 to a commercial-grade publication. Accordingly, the central logic unit 39 in step 170 advances the reviewed galley from the publisher 31 to the repositor 33.

The repositor 33 stores the commercial-grade publication created through the just described sequence executed by the publisher 31. The repositor 33 warehouses each commercial-grade publication converted by the publisher 30. In a preferred embodiment, the repositor 33 includes computer program code for facilitating storage of each commercial-grade publication. Moreover, for ease of reference, the central logic unit 39 preferably catalogs each commercial-grade publication introduced to the repositor 33.

The sales manager 35 performs a variety of tasks. Illustratively, a consumer accesses the network addressable device 30 to obtain a desired commercial-grade publication from the repositor 33. The sales manager 35 retrieves a desired commercial-grade publication from the repositor 33. That is, the sales manager 35 locates that desired publication cataloged in the repository and retrieves the publication. The sales manager 35 then distributes the desired commercial-grade publication to the consumer. Preferably, the sales manager 35 distributes a commercial-grade publication in a format readable by electronic media. For example, a consumer may wish to examine the commercial-grade publication directly in an electronic format for download to a computer or hand-held device, such as a PALM for example. Alternatively, a consumer may want a hard-copy format, such as from a digital copier or an electronic bookstore vending machine as shown in U.S. Pat. No. 6,012,890 for example. The sales manager 35 preferably includes computer program code for retrieving the commercial-grade publication from storage and distribution purposes.

By way of further example, FIG. 1 indicates two avenues for distribution indicated as commercial consumption 55 and direct consumption 56 although those of ordinary skill in the art will recognize other avenues for distribution. The address server 20 includes a seller interface 12' for providing users related with commercial consumption 55 and/or direct consumption 56 access to the network addressable device 30. Illustratively, for example, the seller interface 12' may comprise a browser, a commercial telephone number, mass distributed software such as CD-ROMS, printed material such as a magazine or a catalog, and a commercial service outlet such as a storefront, each, ultimately, linked with the address server 20. Direct consumption 56 makes reference to a situation where a consumer directly accesses the network addressable device 30 via the address server 20 for purposes of obtaining a desired commercial-grade publication. Illustratively, a consumer can access the network addressable device 30 through the seller interface 12' associated with online purchasing, such as through a browser. On the other hand, commercial consumption 55 makes reference to traditional avenues for distribution. Illustratively, a wholesaler or retailer may buy a desired commercial-grade publication directly from the network addressable device 30 so that a consumer then purchases that publication from the retailer or wholesaler.

Furthermore, the sales manager 35 accounts for distribution of each copy of the commercial-grade publication. In the preferred embodiment, the sales manager 35 accounts for distribution for purposes of collecting revenue via the network addressable device 30. The sales manager 35 thus grants a paying consumer access to a desired commercial-grade publication. However, those of ordinary skill in the art will recognize that the sales manager 35 may grant consumer access without collecting revenue. Collected revenue may be used for costs incurred with publishing the authored work 11, for paying copyright and other royalties associated with the authored work 11, and for maintaining the network addressable device 30, especially for the repository 33.

While the present invention has been disclosed in connection with the preferred embodiments thereof, it should be understood that there may be other embodiments which fall within the spirit and scope of the invention as defined by the following claims.

What is claimed is:

1. A network addressable device in a communications network for creating and publishing a commercial grade publication from an authored work, comprising:

(a) a publisher for converting the authored work to a resulting commercial-grade publication wherein the publisher is linked to at least one remote service provider for remote electronic editing of the authored work for content such that a galley is created from the authored work and for returning the galley to the author for creation of the commercial grade publication from the galley;

(b) a repositor linked with the publisher for storing the commercial-grade publication; and (c) a sales manager linked with the repositor for retrieving the commercial-grade publication from the reposter and distributing that commercial-grade publication without modification.

2. The network addressable device according to claim 1 wherein the network addressable device further includes:

(a) an encoder linked with the publisher, the repositor, and the sales manager for securing information associated with the authored work from unsolicited disclosure outside the network addressable device.

3. The network addressable device according to claim 2 wherein the network addressable device is coupled to a browser.

4. The network addressable device according to claim 1 wherein the publisher interfaces with a remot service provider for preparing the authored work for marketability.

5. The network addressable device according to claim 1 wherein the repositor provides the commercial-grade publication to the sales manager.

6. The network addressable device according to claim 1 wherein the sales manager distributes the commercial-grade publication in a format compatible with electronic media.

7. The network addressable device according to claim 1 wherein the sales manager accounts for each distribution of the commercial-grade publication for purposes of collecting revenue.

8. The network addressable device according to claim 1 wherein the network addressable device is linked with the Internet communications network.

9. The network addressable device according to claim 1 wherein the network addressable device is linked with an intranet communications network.

10. A computer program code on computer readable media for creating and publishing a commercial grade publication from an authored work in a communications network, comprising:

(a) a first computer program code for converting the authored work to a resulting commercial-grade publication wherein the first computer program code interfaces with a remote sevice provider for editing the authored work for content such that a galley is created from the authored work and for returning the galley to the author for cr ation of the commercial grade publication from the galley;

(b) a second computer program code linked with the first computer program code for storing the commercial-grade publication; and (c) a third computer program code linked with the second computer program code for retrieving the commercial-grade publication from storage and distributing that commercial-grade publication without modification.

11. The computer program code according to claim 10 wherein the third computer program code accounts for each distribution of the commercial-grade publication for purposes of collecting revenue.

12. The computer program code according to claim 10 wherein the third computer program code interfaces with a remote service provider for preparing the authored work for marketability.

13. The computer program code according to claim 10 wherein the second computer program code provides the commercial-grade publication to the third computer program code.

14. In a communications network environment, a method for creating and publishing a commercial grade publication from an authored work, comprising the steps of:

(a) receiving the authored work within the communications network;

(b) allocating the authored work to a remote service provider for content editing electronically via the communications network to facilitate converting the authored work to a commerical-grade publication such that a galley is created from the authored work;

(c) returning the galley to the author for creation of the commercial grade publication from the galley (d) converting the authored work to a resulting commercial-grade publication; and (e) storing the commercial-grade publication for subsequent publication without modification.

15. The method according to claim 14 further comprising the step of:

(a) distributing the commercial-grade publication.

16. The method according to claim 15 wherein the step of distributing the commercial-grade publication, includes the step of:

(a) formatting the commercial-grade publication for compatibility with electronic media.

* * * * *

UNITED STATES PATENT AND TRADEMARK OFFICE
CERTIFICATE OF CORRECTION

PATENT NO.   : 6,865,548 B2  Page 1 of 1
DATED        : March 8, 2005
INVENTOR(S)  : Alejandro Wiechers It is certified that error appears in the above-identified patent and that said Letters Patent is hereby corrected as shown below:

<u>Column 7,</u>
Line 5, delete "cr ation" and insert therefor -- creation --.

Signed and Sealed this

First Day of November, 2005

JON W. DUDAS
*Director of the United States Patent and Trademark Office*